(12) United States Patent
Polido et al.

(10) Patent No.: US 11,077,564 B1
(45) Date of Patent: Aug. 3, 2021

(54) TOROIDAL SUCTION GRIPPERS

(71) Applicant: Amazon Technologies, Inc., Seattle, WA (US)

(72) Inventors: Felipe De Arruda Camargo Polido, North Reading, MA (US); William Clay Flannigan, Cambridge, MA (US); Harrison Young, Robbinsville, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/569,357

(22) Filed: Sep. 12, 2019

(51) Int. Cl.
*B25J 15/00* (2006.01)
*B25J 15/06* (2006.01)
*B65G 47/91* (2006.01)

(52) U.S. Cl.
CPC .......... *B25J 15/0625* (2013.01); *B65G 47/91* (2013.01)

(58) Field of Classification Search
CPC .............................. B25J 15/0625; B65G 47/91
USPC ................. 294/65, 64.3, 183, 184, 185, 186
See application file for complete search history.

(56) References Cited

U.S. PATENT DOCUMENTS

| | | | | |
|---|---|---|---|---|
| 1,870,694 A | * | 8/1932 | Strickler | B66C 1/0218 294/185 |
| 2,873,996 A | * | 2/1959 | McHugh, Jr. | B65B 21/12 294/90 |
| 3,178,217 A | * | 4/1965 | Bargel | B65B 21/12 294/119.3 |
| 5,029,925 A | * | 7/1991 | Rietzler | B65G 47/908 294/100 |
| 5,263,753 A | * | 11/1993 | Breu | B25J 15/0206 294/196 |
| 6,305,729 B1 | * | 10/2001 | Mukasa | C03B 11/08 294/185 |
| 2003/0160470 A1 | * | 8/2003 | Marshall | B25B 9/00 294/86.4 |
| 2020/0039762 A1 | * | 2/2020 | Schulnig | B67C 7/0053 |

* cited by examiner

*Primary Examiner* — Paul T Chin
(74) *Attorney, Agent, or Firm* — Eversheds Sutherland (US) LLP

(57) ABSTRACT

Systems, methods, and computer-readable media are disclosed for toroidal suction grippers. In one embodiment, an example device may include a first annular elastic membrane configured to form an orifice having a toroid geometry, and a first vacuum suction device disposed in the first annular elastic membrane. The first annular elastic membrane may be configured to be actuated to grasp an object.

19 Claims, 10 Drawing Sheets

TOROIDAL SUCTION GRIPPERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
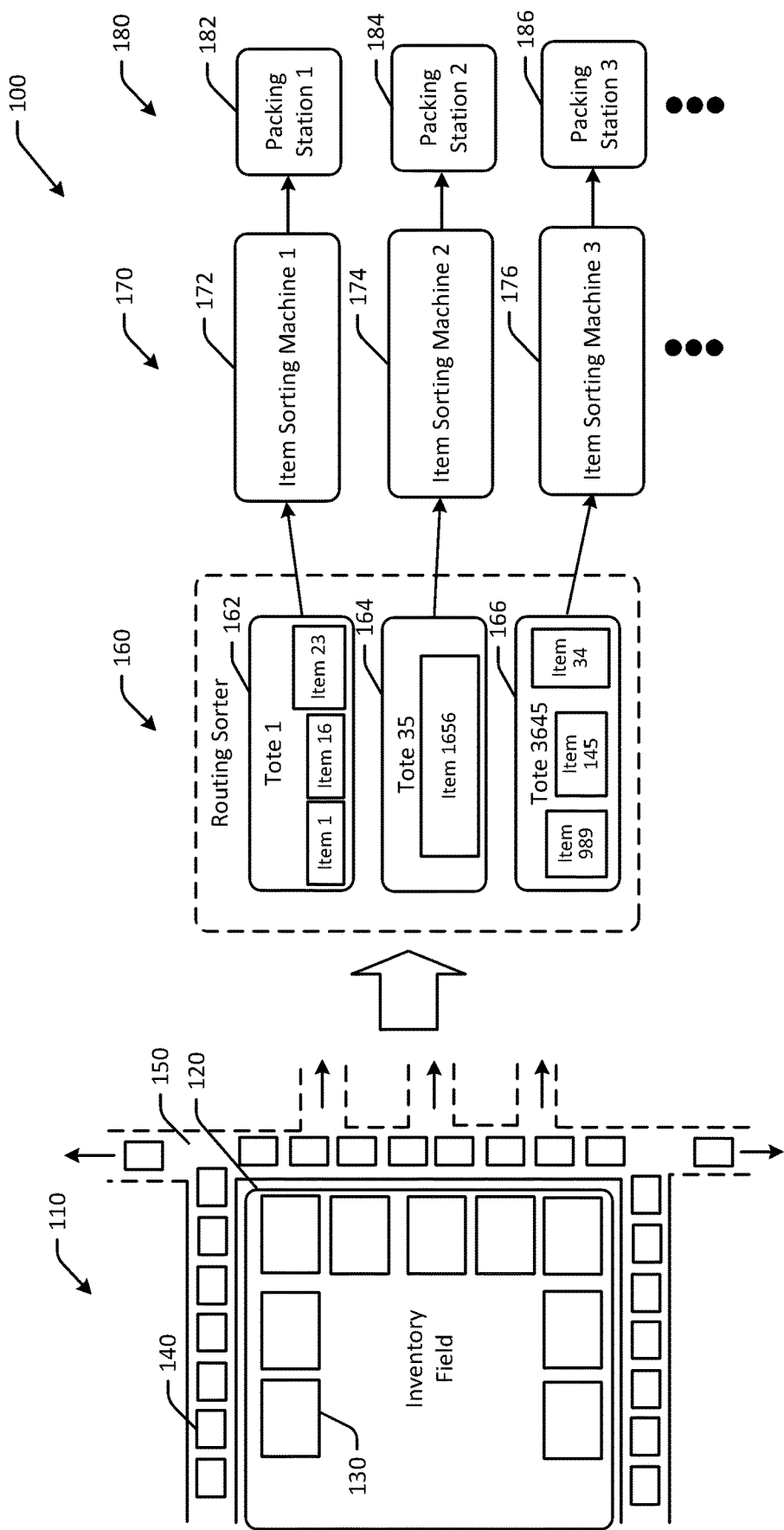
FIG. 1 is a hybrid schematic illustration of an example use case for toroidal suction grippers and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

Moving items or objects through a fulfillment center may require handling of the item itself. For example, picking the item from inventory, placing the item into a container, removing the item from a container, and so forth may all be examples of actions for which an item may need to be handled. In addition, different items may have different types of packaging. For example, some items may come in boxes, some items may come in loose bags, some items may come shrink wrapped, some items may not have any packaging, and so forth. In addition, retrieving a certain number of items, such as singular items, may be difficult depending on a type of packaging in which the item comes with. Humans may be able to manually handle individual items with ease. However, robotic handling of individual items may require various levels of dexterity.

Embodiments of the disclosure include methods and systems for automated handling of items and objects regardless of packaging that may improve processing and fulfillment of orders, or other object aggregation tasks. Certain embodiments include robotic arms with picking assemblies that use toroidal elastic membranes in conjunction with vacuum suction to pick up and/or release, or otherwise handle, objects, so as to increase throughput and speed of object handling. Some embodiments include optimized process flows for processing of orders at fulfillment centers, as well as process flows or methods to increase speed of consolidating products in a multi-item order as a result of improved speed in placing items into containers and removing items from containers. As a result, throughput of fulfillment centers may be improved, and/or logistics of fulfillment center operations may be less complicated.

Referring to FIG. 1, an example use case 100 for toroidal suction grippers and an example process flow in accordance with one or more embodiments of the disclosure. Although discussed in the context of online orders, other embodiments may be directed to any suitable use case where objects are picked and released, such as instances where objects are picked from inventory, placed into containers, removed from containers for sorting, and so forth.

In FIG. 1, a fulfillment center may include an inventory field 110, a routing sorter 160, one or more item sorting machines 170, and one or more packing stations 180. The inventory field 110 may be include a storage platform, or a portion of the fulfillment center at which products picked from product inventory are placed. Robots may be used to pick products from inventory and to deliver to the robotic storage platform in some instances, while in other instances, manual labor or a combination thereof may be used to pick products. For example, toroidal suction grippers may be used to pick objects from inventory containers and to place the retrieved objects into containers. The picking process at the robotic storage platform may include locating a product in an order, obtaining the product, and sending the product to a robotic storage platform, such as via a conveyor belt. In the illustrated embodiment, products at the robotic storage platform may be placed in a container, such as a tote.

The inventory field 110 may include multiple items that are in inventory. The items may be used to fulfill orders. The inventory field 110 may be a robotic field in some instances. One or more picking stations 130 may be positioned along a perimeter 120 of the inventory field 110. The picking stations 130 may be manually operated or may include robotic components, or a combination thereof. In some instances, picking of items from the inventory field 110 may be completed by robots that include toroidal suction grippers, where the items are delivered to the picking stations 130 after being retrieved from the inventory field 110. Any number of picking stations 130 may be included, and the picking stations 130 may be located in a different position than that illustrated in FIG. 1.

One or more conveyors 150 may be disposed about the inventory field 110. For example, conveyors 150 may be disposed along the perimeter 120 of the inventory field 110. The conveyors 150 may run adjacent to the picking stations 130 in some embodiments. Any suitable conveyor configuration may be used. In the illustrated example, the conveyors 150 may include belts or rollers that run alongside the picking stations 130 and include one or more paths to one or more routing sorters.

The conveyors 150 may be used to transport one or more totes 140. For example, as totes 140 move along the conveyors 150, items may be moved from the picking stations 130 into respective totes 140. The totes 140 may be associated with particular item sorting machines, and may be moved using the conveyors 150 to a routing sorter 160.

The routing sorter 160 may be configured to route, divert, or otherwise guide certain totes to an item sorting machine. The routing sorter 160 may include any combination of ramps, slides, rollers, arms, guides, and/or other components to route totes to a particular item sorting machine. At the routing sorter 160, totes including products that have been picked may be routed to the appropriate or designated item sorting machine. For example, the routing sorter 160 may determine an identifier associated with the tote, and may determine an item sorting machine associated with the tote using the identifier. The routing sorter 160 may route or direct the tote to the appropriate item sorting machine.

A number of item sorting machines 170 may be coupled to the routing sorter 160. For example, a first item sorting machine 172, a second item sorting machine 174, a third item sorting machine 176, and so forth may be coupled to the routing sorter 160. The routing sorter 160 may guide totes to the item sorting machines to which they are assigned. For example, a first tote 162 may include item 1, item 16, and item 23, and may be assigned to the first item sorting machine 172. The routing sorter 160 may therefore route the first tote 162 to the first item sorting machine 172 for sortation of the respective items. A second tote 164 may include item 1656, and may be assigned to the second item sorting machine 174. The routing sorter 160 may therefore route the second tote 164 to the second item sorting machine 174 for sortation of the item. A third tote 166 may include item 989, item 145, and item 34, and may be assigned to the third item sorting machine 176. The routing sorter 160 may therefore route the third tote 166 to the third item sorting machine 176 for sortation of the respective items.

Some or all of the item sorting machines may be associated with one or more packing stations 180 that may be used to pack items into a shipment when a multi-item order is complete. For example, the first item sorting machine 172 may be coupled to a first packing station 182, the second item sorting machine 174 may be coupled to a second packing station 184, the third item sorting machine 176 may be coupled to a third packing station 186, and so forth. The item sorting machines may be configured to receive items from totes that have one or more, or multiple, items. The number of totes and/or the number of items associated with respective item sorting machines may be balanced, and multiple totes may be routed to the first item sorting machine 172 and the second item sorting machine 174 at the same time.

At any of the stages of the example fulfillment process of FIG. 1 where handling of objects is used, such as to pick items from inventory, place items in totes, remove items from totes, place items into bins, remove items from bins, place items into boxes for shipping, and so forth, toroidal suction grippers as described herein may be used. As a result, manual effort can be redirected to other tasks.

Embodiments of the disclosure include toroidal suction grippers. Certain embodiments may improve processing speed and/or throughput of fulfillment centers. Certain embodiments may improve performance of mechanical equipment for sortation and/or consolidation of items. While described in the context of online orders, aspects of this disclosure are more broadly applicable to other forms of object handling.

Unlike other suction-based grippers, such as two-fingered parallel grippers with suction cups, embodiments of the disclosure may provide a robust object handling system that improves functionality and flexibility with respect to the types of objects that can be handled using robotic or other mechanical equipment. Some embodiments may include a toroidal elastic membrane fixed to an extensible shaft of a suction cup. As the toroid extends, the elastic membrane may fold over itself, thereby forming a 360 degree conveyor belt that engulfs its target. For example, the elastic membrane may envelope at least a portion of the target, and the envelope may increase or improve a vacuum seal formed between the target and the elastic membrane. As the elastic membrane spreads over a surface of the target, the toroidal orifice of the elastic membrane may continue to move or roll into its inner channel, thereby providing further suction and improving the grip or seal between the target and the elastic membrane. Unlike suction cups, which may perform well on flat surfaces, but struggle to generate lift force as the contact patch becomes more irregular due to vacuum leakage, embodiments of the disclosure may be used for improved performance when handling objects with surface irregularity. In some instances, grasp force is proportional to the quantity and quality of the geometric features that the toroidal suction grippers described herein can envelope. Some embodiments may include a concentric design, where multiple toroidal suction grippers are stacked to handle a wider range of item sizes, and other embodiments may include a concentric array design, which may be configured to handle a wide range of item shapes and sizes.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
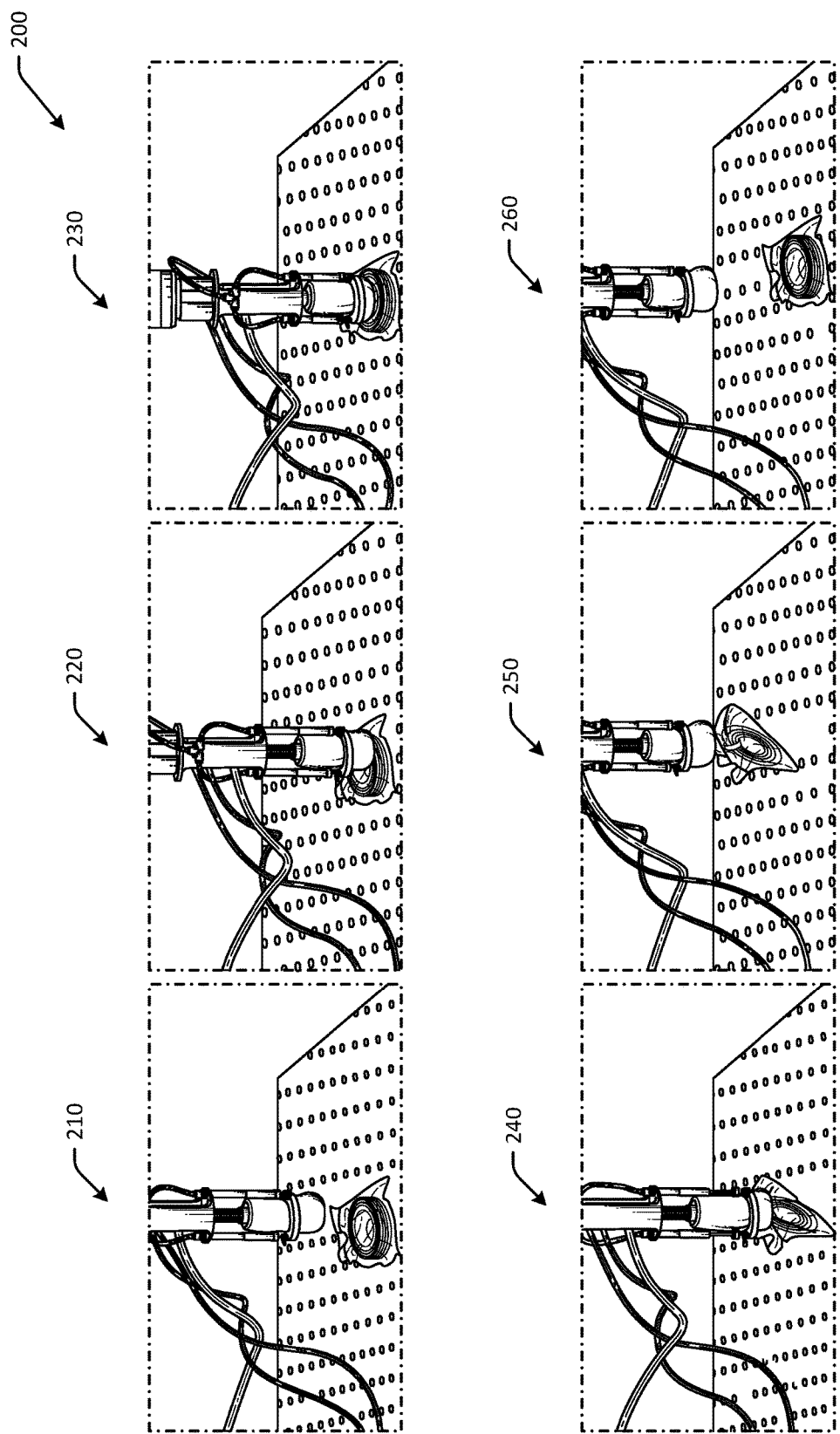
FIG. 2 is a schematic illustration of an example use case for toroidal suction grippers in accordance with one or more embodiments of the disclosure.

FIG. 2 is a schematic illustration of an example use case 200 for toroidal suction grippers in accordance with one or more embodiments of the disclosure. Other embodiments may include additional or fewer components. The illustration of FIG. 2 may not be to scale, and may not be illustrated to scale with respect to other figures. The toroidal suction grippers illustrated in FIG. 2 may be the toroidal suction gripper discussed with respect to FIG. 1.

In FIG. 2, a robotic picking assembly may be used to pick up objects of various form factors and with different packaging materials. In the illustrated example, the robotic picking assembly may be used to pick up a roll of tape in loose plastic bag packaging. Typically, picking up such items may be difficult due to the movement of the roll of tape (or other object in the bag) during movement, leading to a change in center of gravity, etc. for the object. In addition, alignment of a suction cup in a typical picking assembly may be critical. Unlike typical picking assemblies, robotic picking assemblies described herein may not need to be aligned with objects in any particular manner, and may pick up such objects regardless of the loose bag packaging.

For example, at a first instance 210, the robotic picking assembly may be positioned over the object, which may be a roll of tape in FIG. 2. The robotic picking assembly may be configured to pick up, move, and release objects. The robotic picking assembly may include a robotic arm and a picking assembly coupled to the robotic arm. The robotic arm may position the picking assembly roughly over the object. The picking assembly may not need to be positioned in any specific location (e.g., a center, etc.) over the object.

The picking assembly may include an elastic membrane having a toroidal orifice at a distal end. A geometry of the toroidal orifice may change responsive to pressure. For example, the toroidal orifice may spread into an oval or other geometry as the elastic membrane is pressed against a surface. The elastic membrane may include an internal cavity filled with fluid, such as air or a liquid. The picking assembly may include an actuator configured to linearly actuate the elastic membrane from a raised position to a lowered position. The picking assembly may include a ring coupled to the actuator and disposed about an outer surface of the elastic membrane. In some instances, the ring may be part of the actuator. The ring may be configured to move with the actuator. In some embodiments, the ring may be configured to provide the fluid to an internal cavity of the elastic membrane. For example, the ring may include an outlet that is coupled to an inlet of the elastic membrane, and fluid may flow through the outlet to the inlet (or from the inlet to the outlet to reduce fluid pressure). The picking assembly may include a vacuum suction device disposed in the toroidal orifice. For example, the vacuum suction device may be recessed relative to the toroidal orifice, or may otherwise be disposed in a channel formed through the elastic membrane. The vacuum suction device may be configured to provide positive air pressure and/or negative air pressure. The vacuum suction device may be external relative to the elastic membrane when the elastic membrane is in the raised positon, and internal relative to the toroidal orifice when the elastic membrane is in the lowered position. The first vacuum suction device may be configured to generate negative pressure to pick up an object, and positive pressure to release the object. Negative air pressure may generate a sucking or pulling effect, and positive air pressure may generate a pushing effect.

At a second instance 220, the picking assembly of the robotic picking assembly may be lowered over the object. The elastic membrane may make contact with the object, or, more particularly, with the loose plastic bag of the object.

At a third instance 230, pressure may be applied to the object or underlying surface with the picking assembly, causing the elastic membrane to spread. As the elastic membrane spreads, the toroidal orifice may spread as well, enveloping a portion of the plastic packaging. In some embodiments, the elastic membrane may maintain a toroidal geometry as it spreads, whereas in other embodiments, the geometry may change. A material used for the outer surface of the elastic membrane may impact the orifice geometry under pressure. As the pressure is applied (or before contacting the object, or after contacting the object), the vacuum suction device of the robotic picking assembly may generate negative pressure, so as to suck a portion of the object and/or its packing into the orifice of the elastic membrane. Pressure may be applied by actuating the elastic membrane to a second, or lower, position. For example, in some embodiments, as the actuator actuates the elastic membrane, the actuator ring may move downwards as well. As the actuator ring moves downwards with the actuator, the actuator ring may reduce dimensions of an internal channel formed in the elastic membrane, or may otherwise constrict the elastic membrane. As a result, the portion of the object or packaging inside the toroidal orifice may be further secured (in addition to the negative pressure generated by the vacuum suction device). The elastic membrane may be moved from a first position to a second position. The first position may be a raised position and the second position may be a lowered position. The first position and/or second position may be fixed (e.g., the positions may be the same each time, etc.), or may be variable. For example, the second position may be dependent on an amount of feedback pressure at the actuator ring. Feedback pressure may be pressure applied on the actuator ring from the elastic membrane as the actuator ring moves downwards. For example, the actuator ring may keep moving until a certain amount of force (e.g., 1 kg of force, etc.) is detected by the actuator ring or actuator. As a result, the second position may not be the same every time the actuator actuates the elastic membrane.

At a fourth instance 240, the actuator may maintain the second position (e.g., lowered position, etc.) of the elastic membrane to secure the object or other payload in the picking assembly, and may move the object by moving the picking assembly and/or robotic arm. For example, the object may be lifted by moving the picking assembly upwards. The vacuum suction device may maintain and/or increase negative pressure to maintain a grip on the object.

At a fifth instance 250, the picking assembly may maintain its grip on the object during motion. Motion may include any different direction, as well as changes in vertical positioning.

At a sixth instance 260, after reaching a destination, the picking assembly may release the object. To release the object, the actuator may actuate the elastic membrane to the first position, which may be a raised position. As a result, the actuator ring may move along with the actuator, and may release the internal channel. The internal channel may expand, and release the object. In some embodiments, the vacuum suction device may stop generating negative pressure to release the object, while in other embodiments, the vacuum suction device may generate a burst of positive pressure to release the object.

The robotic picking assembly may therefore be used to retrieve objects of different sizes, shapes, form factors, and/or having different types of packaging from one location to another without dropping or losing a grip on the object. Inverting motion of the toroidal orifice of the elastic membrane may draw a portion of an object or its packaging into the elastic membrane for a firm and reliable grip. Although a loose bag object is illustrated in FIG. 1, any suitable object can be picked up by embodiments of the disclosure, including off-center flat objects (e.g., extension of the torus on a flat surface increases the effective suction area of the gripper allowing for effective grasping of flat objects, etc.), round objects, long narrow objects, circular objects, and so forth. In some embodiments, the inverting motion of the toroidal orifice causes the gripper to self-align on off-center items, increasing its effective grasping profile. In addition to enveloping objects, the toroidal orifice may have an increased grasping strength by effectively increasing a width of the vacuum suction device. When the toroidal orifice forms a complete seal, the resulting vacuum may cause the vacuum suction device to collapse on itself.

Accordingly, some embodiments may include a controller configured to cause the picking assembly to pick up an object by positioning the toroidal orifice of the elastic membrane over an object (such as over a center, over a peripheral edge, or over another portion of the object), causing the vacuum suction device to provide negative air pressure, actuating the elastic membrane from a raised position to a lowered position, and causing the picking assembly to move upwards and/or in a lateral direction.

Figure 3:
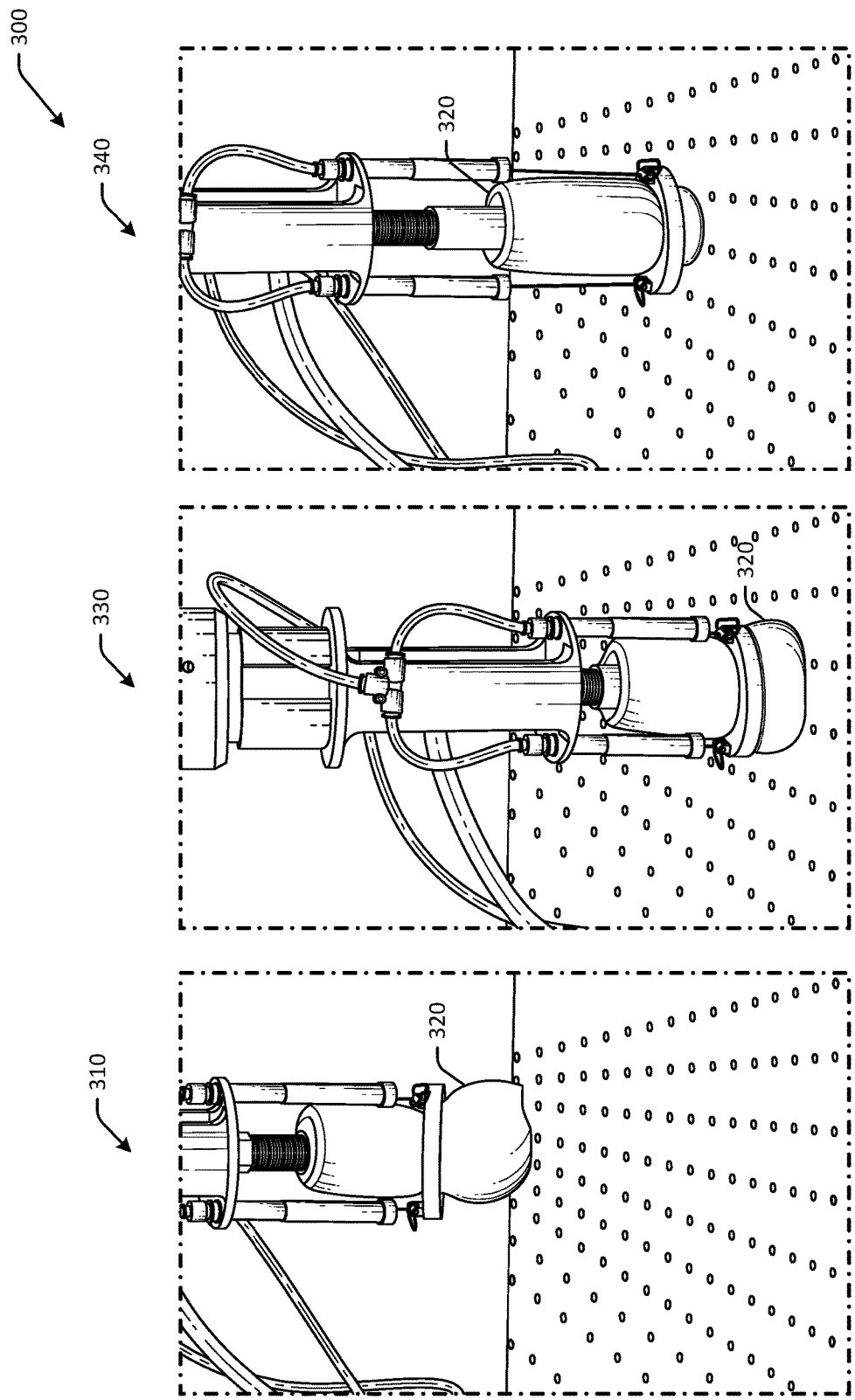
FIG. 3 is a schematic illustration of an example use case for toroidal suction grippers in accordance with one or more embodiments of the disclosure.

FIG. 3 is a schematic illustration of an example use case for toroidal suction grippers in accordance with one or more embodiments of the disclosure. Other embodiments may include additional or fewer components. The illustration of FIG. 3 is not to scale, and may not be illustrated to scale with respect to other figures. The toroidal suction gripper illustrated in FIG. 3 may be the same toroidal suction grippers discussed with respect to FIGS. 1-2.

In FIG. 3, at a first instance 310, a toroidal elastic membrane 320 may be in a first position. In the first position, the actuator and actuator ring may be disposed about a middle portion of the toroidal elastic membrane 320. At a second instance 330, the actuation process may be initiated. As a result, the actuator may actuate the toroidal elastic membrane 320 from the first position to a second position. The second position may be a relatively lower position. As the actuator moves to the second position, the actuator ring may apply pressure to the toroidal elastic membrane 320. In addition, as the actuator moves to the second position, the toroidal elastic membrane 320 may contact an object and spread. The toroidal elastic membrane 320 may include a toroidal orifice that envelopes a portion of an object as it spreads. The greater the amount of pressure applied to the object by the picking assembly, the more the toroidal elastic membrane 320 may spread. As the actuator ring moves downwards, the actuator ring may constrict or compress an internal channel of the toroidal elastic membrane 320. The internal channel may be formed through the toroidal elastic membrane 320. One or more vacuum suction devices may be disposed in the internal channel. As the actuator ring moves downwards, the portion of the object sucked into the internal channel by the vacuum suction device may be further secured as a result of radial pressure applied by the actuator ring. At a third position 340, the picking assembly may be lifted upwards, and the object may be secured by the gripper as the object is moved from one location to another.

Figure 4A:
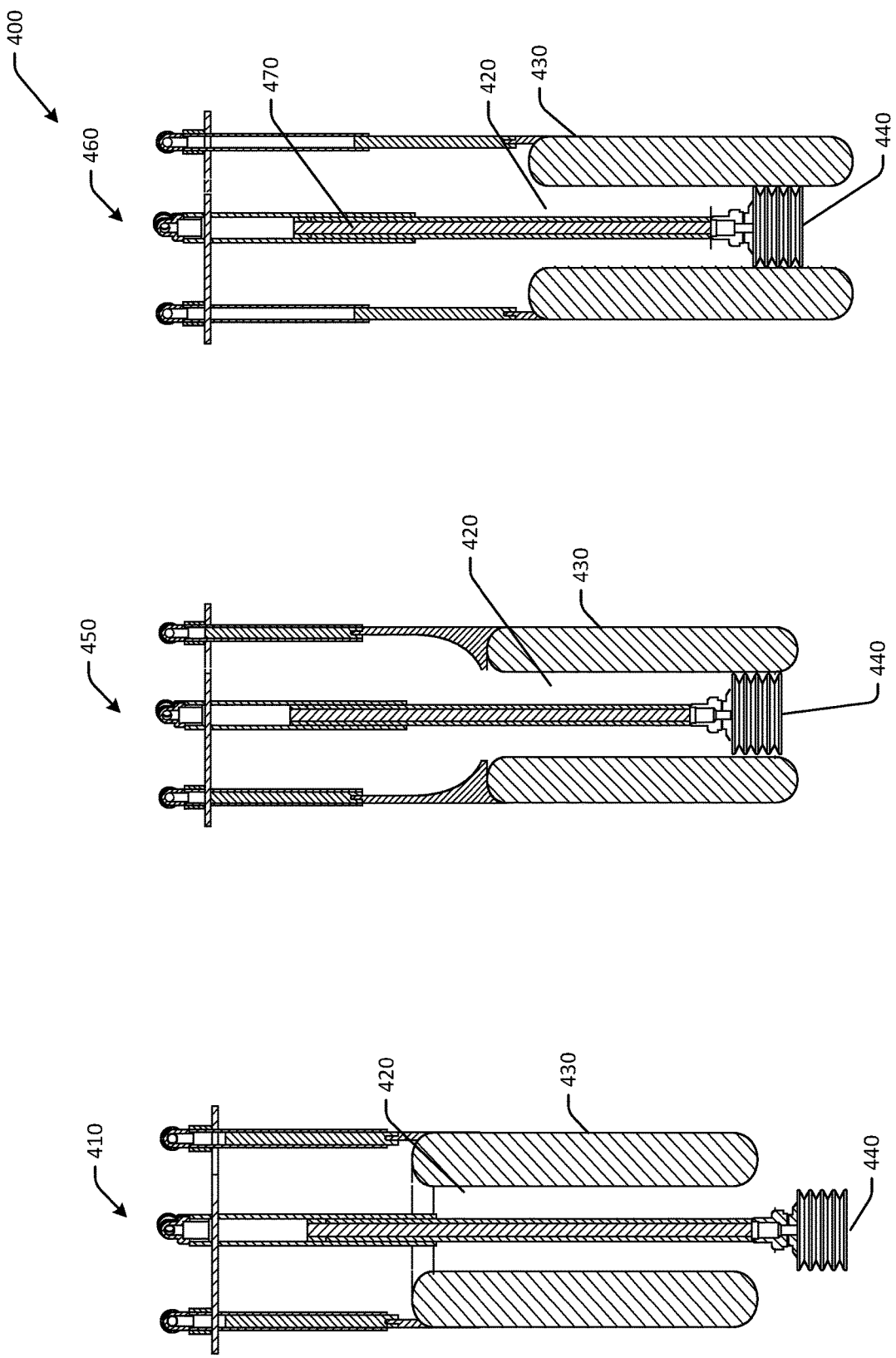
FIG. 4A is a schematic illustration of an example toroidal suction gripper in different states in cross-sectional view in accordance with one or more embodiments of the disclosure.

FIG. 4A is a schematic illustration of an example toroidal suction gripper 400 in different states in cross-sectional view in accordance with one or more embodiments of the disclosure. Other embodiments may include additional or fewer components. The illustration of FIG. 4A is not to scale, and may not be illustrated to scale with respect to other figures. The toroidal suction gripper illustrated in FIG. 4A may be the same toroidal suction grippers discussed with respect to FIGS. 1-3. For example, the illustrated embodiment may include a single toroidal elastic membrane and a single vacuum suction device.

The illustration of FIG. 4A depicts a toroidal suction gripper with one elastic membrane. The sequence of illustrations in FIG. 4A depicts the process of securing an item using the toroidal suction gripper 400.

In a first state 410, the toroidal suction gripper 400 may be in a default position. In the default position, a vacuum suction device 440 of the toroidal suction gripper 400 may be positioned outside of, or otherwise external to, a first annular elastic membrane 430 of the toroidal suction gripper 400. For example, the toroidal suction gripper 400 may include the first annular elastic membrane 430 configured to form an orifice having a toroid geometry, a first vacuum suction device 440 disposed in the first annular elastic membrane 430, and a first actuator configured to linearly actuate the first annular elastic membrane 430 from a first position to a second position. The first annular elastic membrane 430 may form a channel 420 through which the vacuum suction device 440 can move. Fluid and/or air pressure for the vacuum suction device 440 may be provided via one or more connections 470.

The first actuator may include an actuator ring disposed about an outer surface of the first annular elastic membrane 430. The first vacuum suction device 440 may optionally be outside or near an opening of the first annular elastic membrane 430 when the first annular elastic membrane 430 is in the first position, and the first vacuum suction device 440 may be inside the orifice or channel 420 of the first annular elastic membrane 430 when the first annular elastic membrane 430 is in the second position.

The toroidal suction gripper 400 may include a robotic arm configured to move the device from a first location to a second location. The first annular elastic membrane 430 may include fluid inside the respective annular elastic membranes. The fluid may enter and/or exit the respective annular elastic membranes via an outlet of an actuator ring. In some embodiments, a single actuator ring may be used for the first annular elastic membrane 430. The actuator ring may be disposed about the first annular elastic membrane 430. A fluid pressure of the respective annular elastic membranes may be adjustable based at least in part on an amount of fluid in the annular elastic membranes. The first annular elastic membrane 430 may be configured to grip a portion of an object in the respective toroidal orifices. A material of the first annular elastic membrane 430 may be configured for uniaxial elongation. Accordingly, the material may stretch along a vertical, and not horizontal, axis in some embodiments.

In the first state 410, the vacuum suction device 440 may be disposed outside of the first annular elastic membrane 430. As the picking assembly approaches an object to pick up, the picking assembly may gradually move to a second state 450.

At the second state 450, the actuator for the first annular elastic membrane 430 may begin actuating the first annular elastic membrane 420 to a second, or lower, position. The picking assembly may include one or more actuators for the different annular elastic membranes. As the picking assembly moves to the second state 450, the vacuum suction device 440 may begin to recede into the internal channel 420 of the first annular elastic membrane 430. The first annular elastic membrane 430 may move downwards, rather than the vacuum suction device 440 moving upwards to create the receding effect. The first annular elastic membrane 430 may spread as it contacts the object and may envelop a portion of the object. The picking assembly may gradually transition to a third state 460.

At the third state 460, the first annular elastic membrane 430 may be actuated to a retracted position. The object may therefore be secured in the picking assembly.

Although a single picking assembly is illustrated in FIG. 4A, in some embodiments, more than one picking assembly may be used in conjunction with each other to pick up objects. For example, some embodiments may include multiple picking assemblies arranged in an array or in a vertically offset arrangement to pick up objects. For example, the picking assembly illustrated in FIG. 4A may be a first picking assembly, and the robotic picking assembly may also include a second picking assembly disposed adjacent to the first picking assembly, and a third picking assembly disposed adjacent to the first picking assembly. The second picking assembly and/or the third picking assembly are in an offset vertical position with respect to the first picking assembly. Such an arrangement may improve the ability of the device to pick up objects with non-uniform surface features, such as heavy bags of cat food. In another example, the picking assembly illustrated in FIG. 4A may be a first picking assembly, and the robotic picking assembly may include a second picking assembly disposed adjacent to the first picking assembly, and a third picking assembly disposed adjacent to the first picking assembly. The second picking assembly and/or the third picking assembly may be arranged around the first picking assembly in a concentric arrangement, a circular arrangement, an elliptical arrangement, an oval arrangement, a rectangular arrangement, and the like.

Figure 4B:
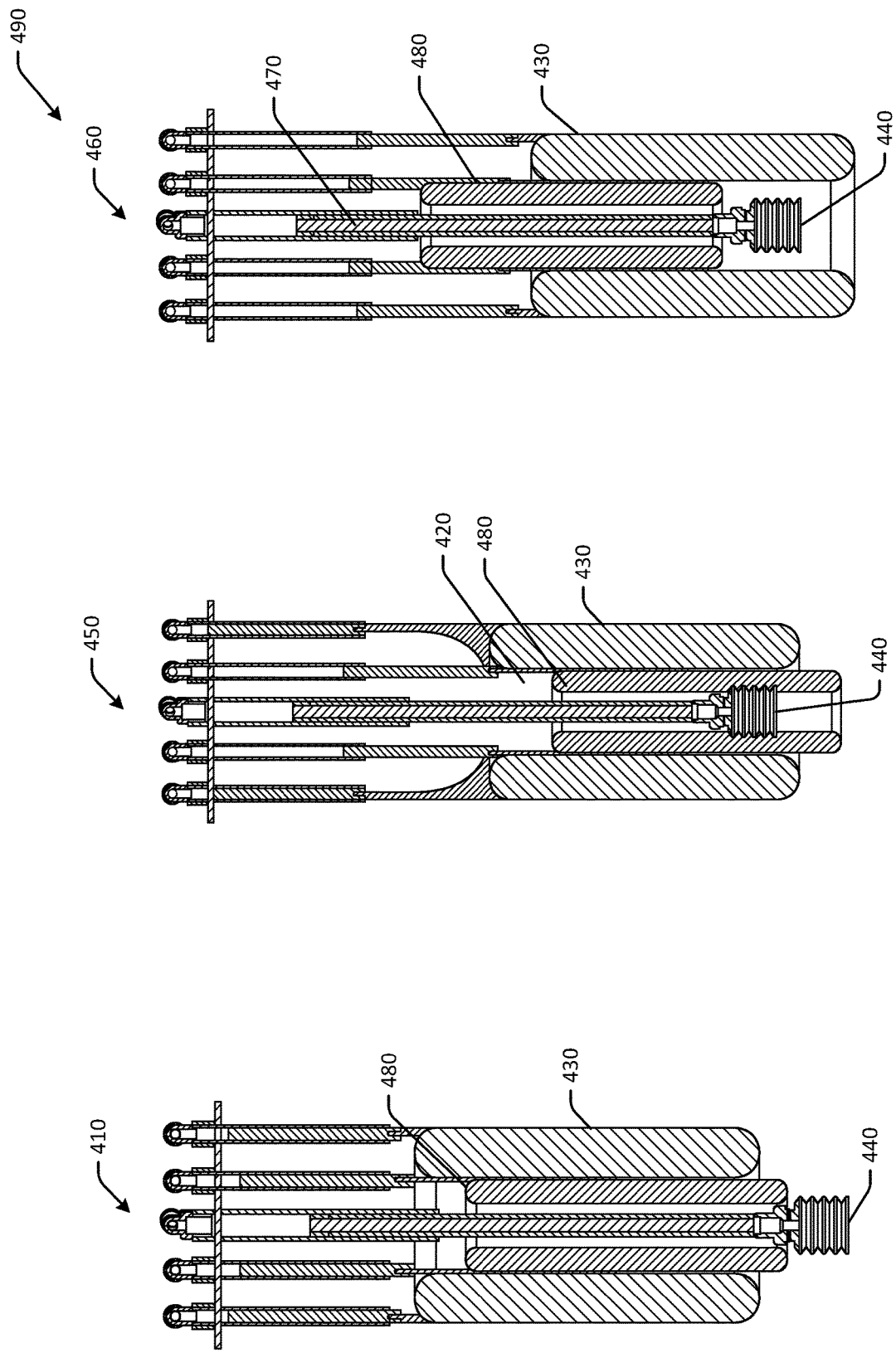
FIG. 4B is a schematic illustration of an example toroidal suction gripper in different states in cross-sectional view in accordance with one or more embodiments of the disclosure.

FIG. 4B is a schematic illustration of an example toroidal suction gripper 490 in different states in cross-sectional view in accordance with one or more embodiments of the disclosure. Other embodiments may include additional or fewer components. The illustration of FIG. 4B is not to scale, and may not be illustrated to scale with respect to other figures. The toroidal suction gripper illustrated in FIG. 4B may be the same toroidal suction grippers discussed with respect to FIGS. 1-3.

The illustration of FIG. 4B depicts a toroidal suction gripper with more than one elastic membrane in a concentric arrangement. For example, a first elastic membrane may be disposed in an internal channel of a second elastic membrane that is larger than the first elastic membrane. The sequence of illustrations in FIG. 4B depicts the process of securing an item using the toroidal suction gripper 490.

In a first state 410, the toroidal suction gripper 490 may be in a default position. In the default position, a vacuum suction device 440 of the toroidal suction gripper 490 may be positioned outside of, or otherwise external to, a first annular elastic membrane 430 of the toroidal suction gripper 490. For example, the toroidal suction gripper 490 may include a first annular elastic membrane 430 configured to form an orifice having a toroid geometry, a first vacuum suction device 440 disposed in the first annular elastic membrane 430, and a first actuator configured to linearly actuate the first annular elastic membrane 430 from a first position to a second position. The first actuator may include an actuator ring disposed about an outer surface of the first annular elastic membrane 430. The first vacuum suction device 440 may be outside the first annular elastic membrane 430 when the first annular elastic membrane 430 is in the first position, and the first vacuum suction device 440 may be inside the orifice of the first annular elastic membrane 430 when the first annular elastic membrane 430 is in the second position.

In the example of FIG. 4B, the toroidal suction gripper 490 may include a second annular elastic membrane 480 disposed about the first annular elastic membrane 430. The second annular elastic membrane 480 may have the same or different dimensions that the first annular elastic membrane 430. For example, the second annular elastic membrane 480 may have a greater lateral thickness than the first annular elastic membrane 430. The toroidal suction gripper 490 may include a robotic arm configured to move the device from a first location to a second location. The first annular elastic membrane 430 and/or the second annular elastic membrane 480 may include fluid inside the respective annular elastic membranes. The fluid may enter and/or exit the respective annular elastic membranes via an outlet of an actuator ring. In some embodiments, a single actuator ring may be used for both the first annular elastic membrane 430 and the second annular elastic membrane 480. The actuator ring may be disposed about the first annular elastic membrane 430 (e.g., between the two annular elastic membranes, etc.) or the second annular elastic membrane 480. A fluid pressure of the respective annular elastic membranes may be adjustable based at least in part on an amount of fluid in the annular elastic membranes. The first annular elastic membrane 430 and the second annular elastic membrane 480 may be configured to grip a portion of an object in the respective toroidal orifices. A material of the first annular elastic membrane 430 and/or the second annular elastic membrane 480 may be configured for uniaxial elongation. Accordingly, the material may stretch along a vertical, and not horizontal, axis in some embodiments.

In the first state 410, the vacuum suction device 440 may be disposed outside of both the first annular elastic membrane 430 and the second annular elastic membrane 480. As the picking assembly approaches an object to pick up, the picking assembly may gradually move to a second state 450.

At the second state 450, the actuator for the first annular elastic membrane 430 and/or the second annular elastic membrane 480 may begin actuating the first annular elastic membrane 430 to a second, or lower, position. The picking assembly may include one or more actuators for the different annular elastic membranes. As the picking assembly moves to the second state 450, the vacuum suction device 440 may begin to recede into the internal channel 420 of the first annular elastic membrane 430 and/or the second annular elastic membrane 480. The first annular elastic membrane 430 may move downwards, rather than the vacuum suction device 440 moving upwards to create the receding effect. The first annular elastic membrane 430 may spread as it contacts the object and may envelop a portion of the object. The picking assembly may gradually transition to a third state 460.

At the third state 460, the first annular elastic membrane 430 may be actuated to a retracted position, and the second annular elastic membrane 480 may be actuated to a lower position, such that the second annular elastic membrane 480 provides additional grip to the object. The object may therefore be secured in the picking assembly.

Although a single picking assembly is illustrated in FIG. 4B, in some embodiments, more than one picking assembly may be used in conjunction with each other to pick up objects. For example, some embodiments may include multiple picking assemblies arranged in an array or in a vertically offset arrangement to pick up objects. For example, the picking assembly illustrated in FIG. 4B may be a first picking assembly, and the robotic picking assembly may also include a second picking assembly disposed adjacent to the first picking assembly, and a third picking assembly disposed adjacent to the first picking assembly. The second picking assembly and/or the third picking assembly are in an offset vertical position with respect to the first picking assembly. Such an arrangement may improve the ability of the device to pick up objects with non-uniform surface features, such as heavy bags of cat food. In another example, the picking assembly illustrated in FIG. 4B may be a first picking assembly, and the robotic picking assembly may include a second picking assembly disposed adjacent to the first picking assembly, and a third picking assembly disposed adjacent to the first picking assembly. The second picking assembly and/or the third picking assembly may be arranged around the first picking assembly in a concentric arrangement, a circular arrangement, an elliptical arrangement, an oval arrangement, a rectangular arrangement, and the like.

Figure 5A:
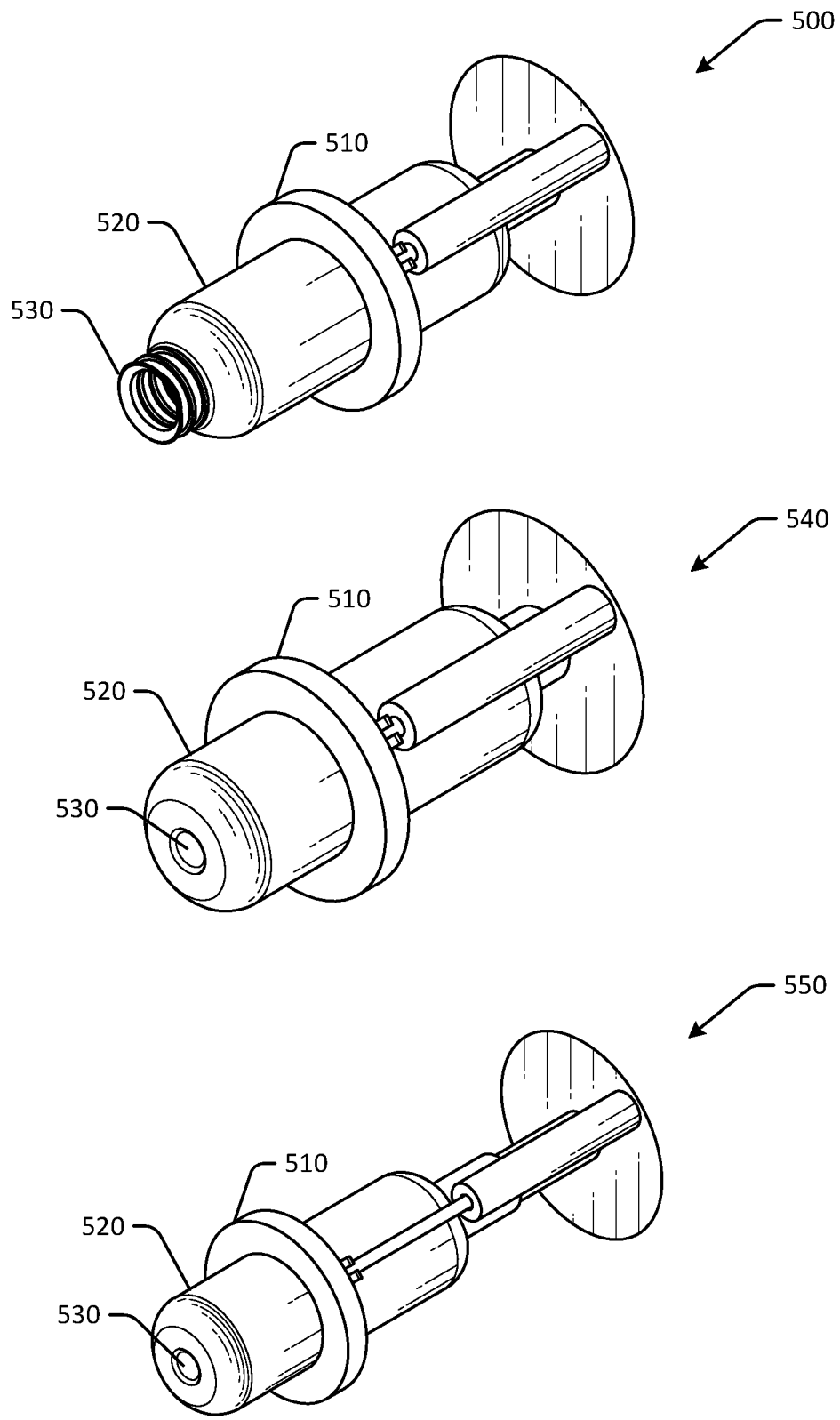
FIG. 5A is a schematic illustration of an example toroidal suction gripper in different states in perspective view in accordance with one or more embodiments of the disclosure.

FIG. 5A is a schematic illustration of an example toroidal suction gripper in different states in perspective view in accordance with one or more embodiments of the disclosure. Other embodiments may include additional or fewer components. The illustration of FIG. 5A is not to scale, and may not be illustrated to scale with respect to other figures. The toroidal suction gripper illustrated in FIG. 5A may be the same toroidal suction gripper discussed with respect to FIG. 4A.

In FIG. 5A, a picking assembly of the toroidal suction gripper is illustrated in perspective view. At a first state 500, the picking assembly may be in a first position. In the first position, an elastic membrane 520 of the picking assembly may be retracted, and a vacuum suction device 530 may protrude from a toroidal orifice of the elastic membrane 520. The vacuum suction device 530 may be disposed in an internal channel formed by the elastic membrane 520. An actuator ring 510 may be disposed about the elastic membrane 520 and may be configured to move or translate with respect to the vacuum suction device 530.

At a second state 540, the picking assembly may be in an intermediate position. In the intermediate position, the elastic membrane 520 may be in a slightly extended position, and the vacuum suction device 530 may be disposed in the internal channel of the elastic membrane 520. The actuator ring 510 may apply increased amount of pressure on the internal channel as it moves downwards.

At a third state 550, the elastic membrane 520 may be in a second position and may be fully extended. The actuator ring 510 may apply pressure to a portion of an object disposed in the internal channel. A toroidal orifice of the elastic membrane 520 may contact an object that is to be picked up. The suction or negative pressure generated by the vacuum suction device 530 may cause a portion of the object to be pulled into the internal channel. Movement of the elastic membrane 520 may be controlled using one or more actuators. In some embodiments, the vacuum suction device 530 may have a static position, and the elastic membrane 520 may move with respect to the vacuum suction device 530.

Figure 5B:
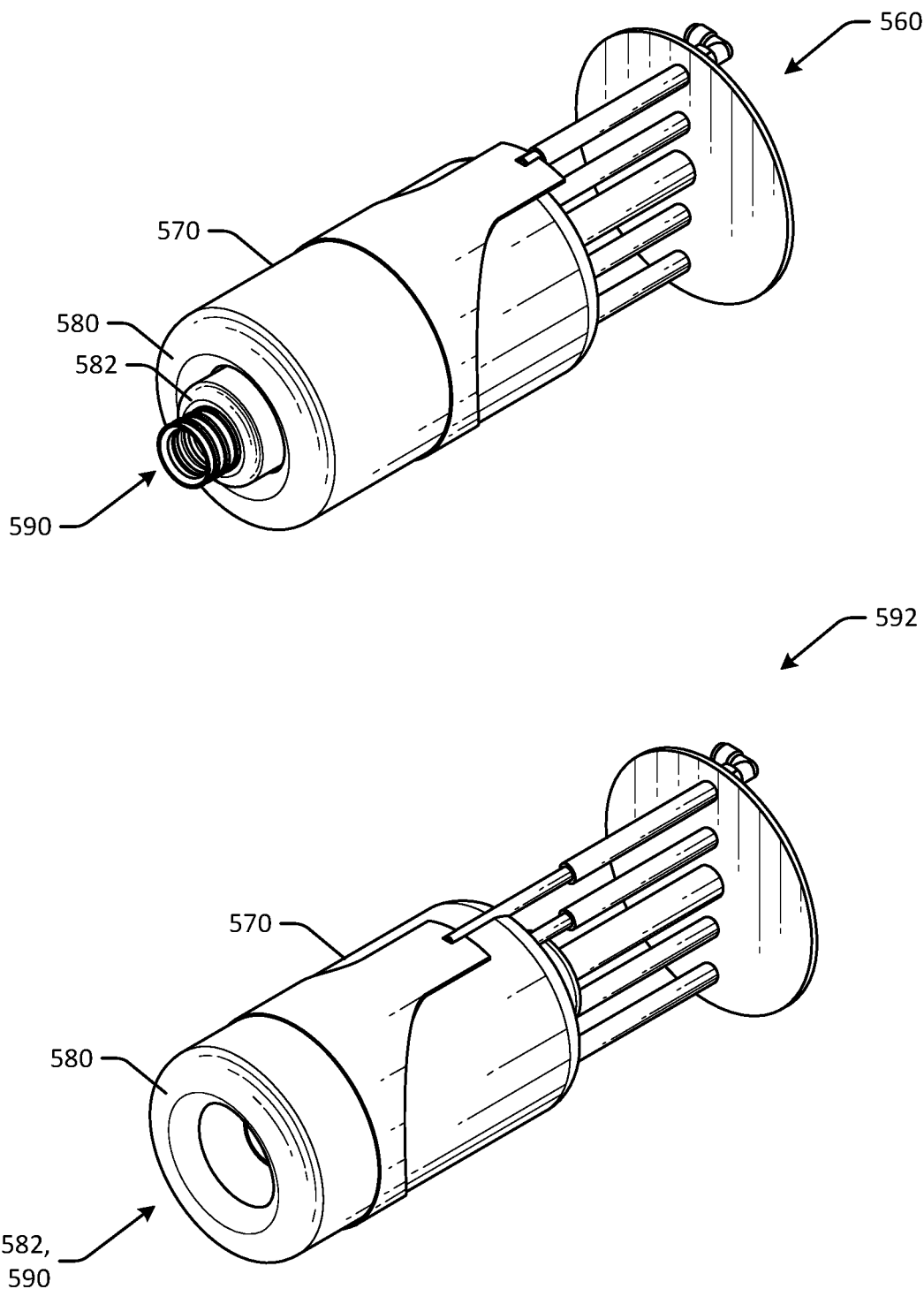
FIG. 5B is a schematic illustration of an example toroidal suction gripper in different states in perspective view in accordance with one or more embodiments of the disclosure.

FIG. 5B is a schematic illustration of an example toroidal suction gripper in different states in perspective view in accordance with one or more embodiments of the disclosure. Other embodiments may include additional or fewer components. The illustration of FIG. 5B is not to scale, and may not be illustrated to scale with respect to other figures. The toroidal suction gripper illustrated in FIG. 5B may be the same toroidal suction gripper discussed with respect to FIG. 4B.

In FIG. 5B, a picking assembly of the toroidal suction gripper is illustrated in perspective view. At a first state 560, the picking assembly may be in a first position. In the first position, an elastic membrane 570 of the picking assembly may be retracted, along with a second elastic membrane 582 disposed within the elastic membrane 570, and a vacuum suction device 590 may protrude from a toroidal orifice of the elastic membrane 570. The vacuum suction device 590 may be disposed in an internal channel formed by the elastic membrane 570.

At a second state 592, the picking assembly may be in a second position. In the second position, the elastic membrane 570 may be in the extended position, and the vacuum suction device 590 may be disposed in the internal channel of the elastic membrane 570, along with the second elastic membrane 582. Accordingly, a toroidal orifice of the elastic membrane 570 may contact an object that is to be picked up. The suction or negative pressure generated by the vacuum suction device 590 may cause a portion of the object to be pulled into the internal channel. Movement of the elastic membrane 570 may be controlled using one or more actuators. In some embodiments, the vacuum suction device 590 may have a static position, and the elastic membrane 570 may move with respect to the vacuum suction device 590.

Figure 6:
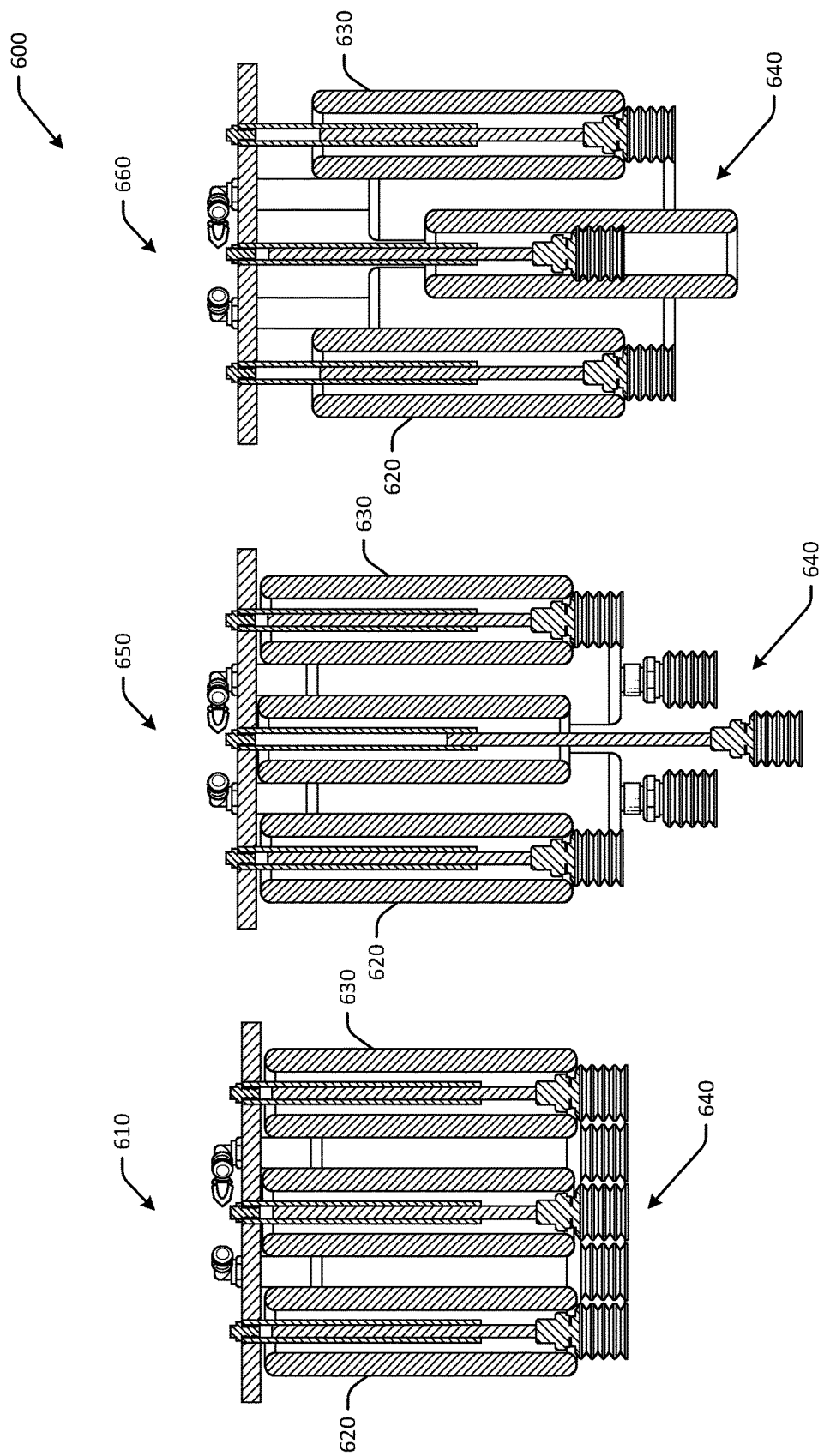
FIG. 6 is a schematic illustration of an example toroidal suction gripper with multiple assemblies in different states in cross-sectional view in accordance with one or more embodiments of the disclosure.

FIG. 6 is a schematic illustration of an example toroidal suction gripper 600 with multiple assemblies in different states in cross-sectional view in accordance with one or more embodiments of the disclosure. Other embodiments may include additional or fewer components. The illustration of FIG. 6 is not to scale, and may not be illustrated to scale with respect to other figures. The toroidal suction gripper illustrated in FIG. 6 may incorporate the same toroidal suction grippers discussed with respect to FIGS. 1-5B.

In FIG. 6, the toroidal suction gripper 600 may include more than one individual picking assembly. The picking assemblies may be arranged in a side-by-side, concentric, or other suitable arrangement. The picking assemblies may have the same initial vertical positioning, as illustrated in FIG. 1. The toroidal suction gripper 600 may provide improved gripping force for heavy or hard to handle objects.

At a first instance 610, the toroidal suction gripper 600 may include five separate picking assemblies in a default position. The picking assemblies may include individual elastic membranes and vacuum suction devices 640. For example, a first picking assembly may include a first elastic membrane 620 and a second elastic membrane may include a second elastic membrane 630.

Operation of the toroidal suction gripper 600 may include moving or actuating different picking assemblies at different times. For example, at a second instance 650, the toroidal suction gripper 600 may be moving from the default position to a second position during a picking operation. In the second instance 650, the vacuum suction device of a central picking assembly may be extended downwards. The vacuum suction devices of adjacent picking assemblies may also be extended downwards, but at a staggered pacing relative to the vacuum suction device of the first picking assembly. As a result, there may be a gap between the first vacuum suction device and the adjacent vacuum suction devices. In some embodiments, the outside vacuum suction devices may be moved to downwards positions after the second set of vacuum suction devices are moved (e.g., at a staggered pace again, etc.).

At a third instance 660, the vacuum suction devices may be retracted back into the respective elastic membranes to secure the object. A portion of the object may be pulled into one or more of the elastic membranes to secure the object.

Accordingly, the toroidal suction gripper 600 may include a plurality of actuators, where respective actuators of the plurality of actuators are aligned with individual annular elastic membranes of the plurality of annular elastic membranes. In some embodiments, the toroidal suction gripper 600 may include a plurality of annular elastic membranes disposed about the first annular membrane in a concentric arrangement and/or in a vertically offset arrangement.

Figure 7:
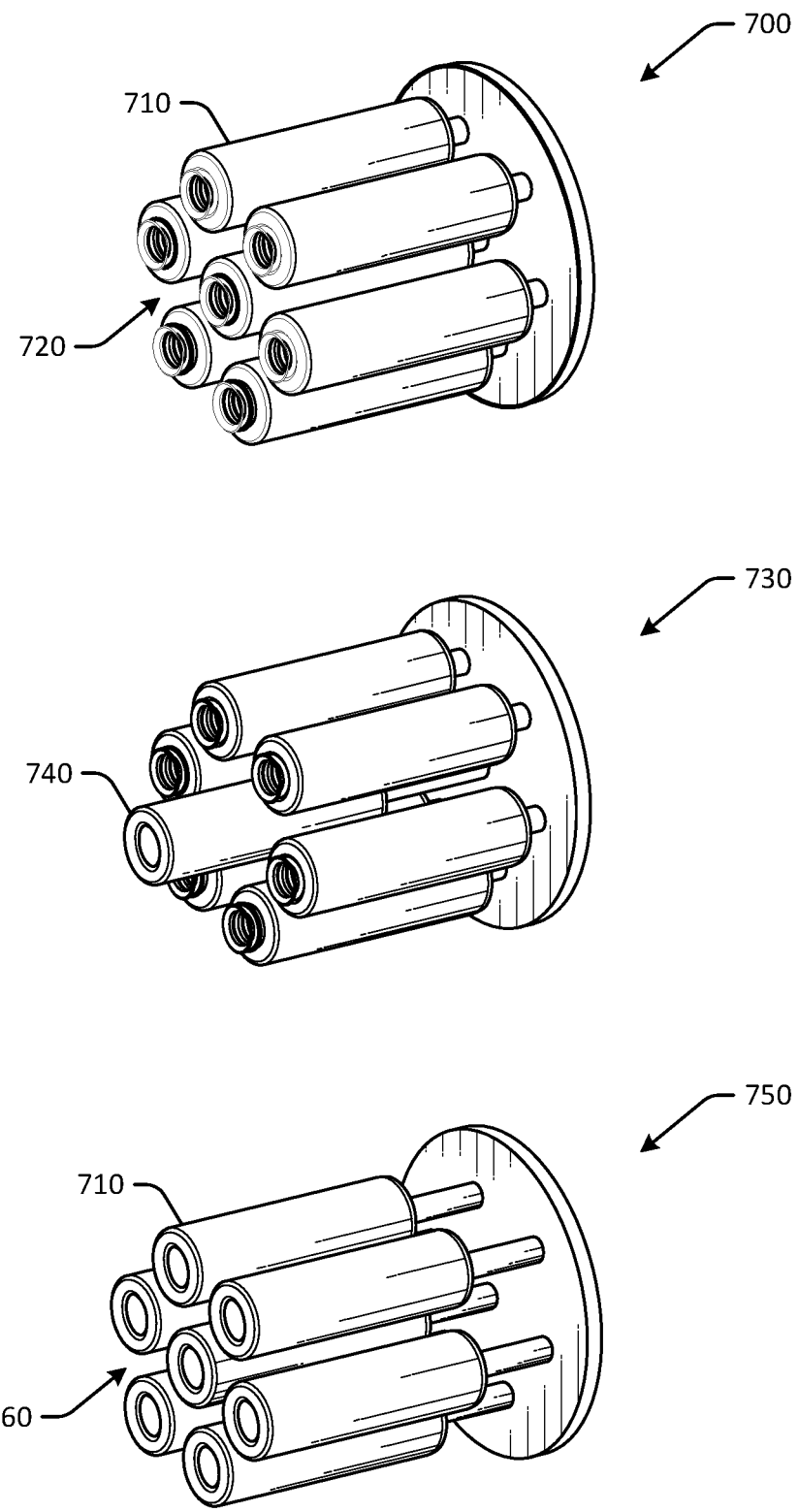
FIG. 7 is a schematic illustration of an example toroidal suction gripper with multiple assemblies in different states in perspective view in accordance with one or more embodiments of the disclosure.

FIG. 7 is a schematic illustration of an example toroidal suction gripper 700 with multiple assemblies in different states in perspective view in accordance with one or more embodiments of the disclosure. Other embodiments may include additional or fewer components. The illustration of FIG. 7 is not to scale, and may not be illustrated to scale with respect to other figures. The toroidal suction gripper illustrated in FIG. 7 may be the same toroidal suction gripper discussed with respect to FIG. 6.

In FIG. 7, the toroidal suction gripper 700 is illustrated in a default position, where the respective elastic membranes 710 are retracted and respective vacuum suction devices 720 are disposed at or near distal ends of the respective elastic membranes. In an intermediate position 730, the vacuum suction device and elastic membrane of a central picking assembly may be extended toward a second position. In an extended position 750, each of the elastic membranes may be in an extended position, and the respective vacuum suction devices may be recessed with respect to toroidal orifices 760 formed at ends of the respective elastic membranes 710. The toroidal suction gripper 700 may be used to pick up and/or move items in the extended position 750.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
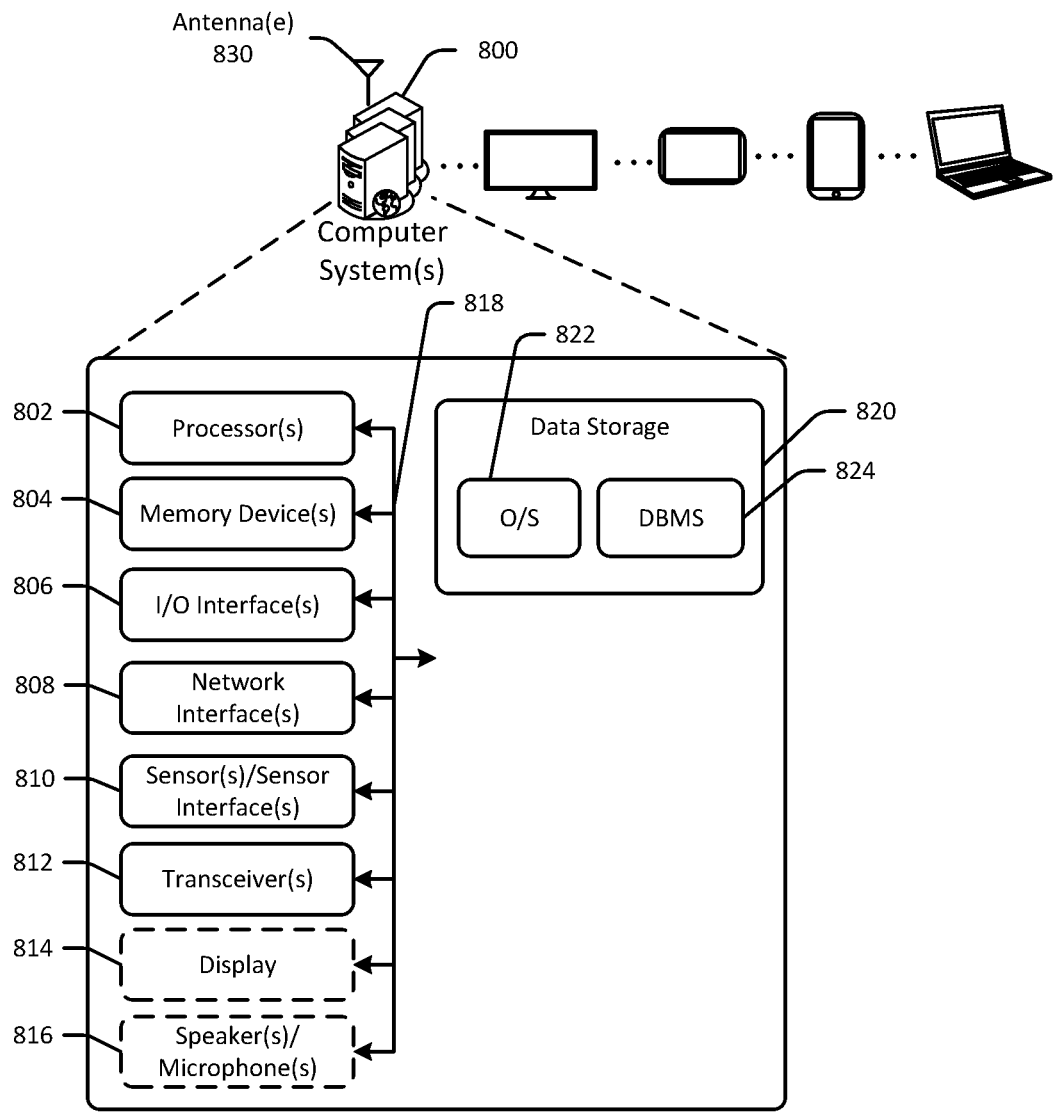
FIG. 8 schematically illustrates an example architecture of a computer system associated with an item picking system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for the device(s) of FIGS. 1-7. For example, the computer system(s) 800 may control one or more aspects of the toroidal suction grippers described in FIGS. 1-7.

The computer system(s) 800 may be configured to communicate with one or more servers, user devices, or the like.

The computer system(s) 800 may be configured to identify items, retrieve items, move items, and so forth.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(e) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 830 may include any suitable type of antenna depending, for example, on the communications protocols used to transmit or receive signals via the antenna (e) 830. Non-limiting examples of suitable antennae may include directional antennae, non-directional antennae, dipole antennae, folded dipole antennae, patch antennae, multiple-input multiple-output (MIMO) antennae, or the like. The antenna(e) 830 may be communicatively coupled to one or more transceivers 812 or radio components to which or from which signals may be transmitted or received.

As previously described, the antenna(e) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 830 may be configured to transmit or receive radio frequency signals within any suitable frequency range forming part of the unlicensed portion of the radio spectrum.

The antenna(e) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(e) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A robotic picking assembly comprising:
a robotic arm;
a picking assembly coupled to the robotic arm and configured to pick up and release objects, the picking assembly comprising:
an elastic membrane having a toroidal orifice at a distal end, wherein a geometry of the toroidal orifice changes responsive to pressure, the elastic membrane comprising an internal cavity filled with fluid;
an actuator configured to linearly actuate the elastic membrane;
an actuation component coupled to the actuator and disposed about an outer surface of the elastic membrane, wherein the actuation component moves with the actuator, and wherein the actuation component is configured to provide the fluid to the internal cavity of the elastic membrane; and
a vacuum suction device disposed in the toroidal orifice, the vacuum suction device configured to provide positive air pressure and negative air pressure.

2. The robotic picking assembly of claim 1, further comprising:
a controller configured to cause the picking assembly to pick up an object by:
positioning the toroidal orifice over a peripheral edge of the object;
causing the vacuum suction device to provide negative air pressure;
actuating the elastic membrane from the raised position to the lowered position; and
causing the picking assembly to move upwards.

3. The robotic picking assembly of claim 1, wherein the picking assembly is a first picking assembly, the robotic picking assembly further comprising:
a second picking assembly disposed adjacent to the first picking assembly; and
a third picking assembly disposed adjacent to the first picking assembly;
wherein the second picking assembly and the third picking assembly are in an offset vertical position with respect to the first picking assembly.

4. The robotic picking assembly of claim 1, wherein the picking assembly is a first picking assembly, the robotic picking assembly further comprising:
a second picking assembly disposed adjacent to the first picking assembly; and
a third picking assembly disposed adjacent to the first picking assembly;
wherein the second picking assembly and the third picking assembly are arranged in a concentric arrangement about the first picking assembly.

5. A device comprising:
a first annular elastic membrane configured to form an orifice having a toroid geometry; and
a first vacuum suction device disposed in the first annular elastic membrane;
wherein the first annular elastic membrane is configured to be actuated to grasp an object, and wherein the first vacuum suction device is configured to be actuated to cause an outer surface of the first annular elastic membrane to be pulled into a channel formed by the first annular elastic membrane.

6. The device of claim 5, wherein the first annular elastic membrane is configured to be actuated to spread the orifice around the object.

7. The device of claim 6, further comprising:
a first actuator configured to actuate the first annular elastic membrane from a first position to a second position, the first actuator comprising an actuator ring disposed about an outer surface of the first annular elastic membrane.

8. The device of claim 5, further comprising:
a robotic arm coupled to the device and configured to move the device from a first location to a second location.

9. The device of claim 5, further comprising:
a fluid inside the first annular elastic membrane;
wherein a fluid pressure of the annular elastic membrane is adjustable based at least in part on an amount of fluid in the annular elastic membrane.

10. The device of claim 9, further comprising:
a plurality of actuators;
wherein respective actuators of the plurality of actuators are aligned with individual annular elastic membranes of the plurality of annular elastic membranes.

11. The device of claim 5, further comprising:
a plurality of annular elastic membranes disposed about the first annular membrane;
wherein the plurality of annular elastic membranes is arranged in a concentric arrangement.

12. The device of claim 5, further comprising:
a plurality of annular elastic membranes disposed about the first annular membrane;
wherein the plurality of annular elastic membranes is arranged in a vertically offset arrangement.

13. The device of claim 5, wherein a material of the first annular elastic membrane is configured for uniaxial elongation.

14. The device of claim 5, wherein the first vacuum suction device is configured to generate negative pressure to pick up an object, and positive pressure to release the object.

15. A robotic picking system comprising:
an annular elastic membrane configured to form a toroidal orifice;
a vacuum suction device disposed in the annular elastic membrane; and
an actuator configured to actuate the annular elastic membrane from a first position to a second position, the actuator comprising an actuator component disposed about an outer surface of the first annular elastic membrane.

16. The robotic picking system of claim 15, further comprising:
a plurality of annular elastic membranes.

17. The robotic picking system of claim 15, further comprising:
a controller configured to cause robotic picking system to pick up an object by:
positioning the toroidal orifice over a peripheral edge of the object;
causing the vacuum suction device to provide negative air pressure;
actuating the annular elastic membrane from the first position to the second position; and
causing the robotic picking system to move upwards.

18. The robotic picking system of claim 17, wherein the controller is further configured to:
cause the vacuum suction device to provide positive air pressure to release the object.

19. The robotic picking system of claim 17, wherein a material of the first annular elastic membrane is configured for uniaxial elongation.

\* \* \* \* \*